United States Patent
Baumbauer

Patent Number: 5,771,386
Date of Patent: Jun. 23, 1998

[54] SOFTWARE CONFIGURATION IN A TELECOMMUNICATION DEVICE

[75] Inventor: Lothar Baumbauer, Erlangen, Germany

[73] Assignee: U.S. Philips Corporation, New York, N.Y.

[21] Appl. No.: 704,764
[22] PCT Filed: Jan. 26, 1996
[86] PCT No.: PCT/IB96/00070

§ 371 Date: Sep. 26, 1996

§ 102(e) Date: Sep. 26, 1996

[87] PCT Pub. No.: WO96/23255

PCT Pub. Date: Aug. 1, 1996

[30] Foreign Application Priority Data

Jan. 28, 1995 [DE] Germany ................. 195 02 728.0

[51] Int. Cl.[6] .................................................. G06F 9/44
[52] U.S. Cl. ........................................ 395/710; 395/685
[58] Field of Search .................................. 395/710, 685, 395/680, 701

[56] References Cited

U.S. PATENT DOCUMENTS

| | | | |
|---|---|---|---|
| 5,247,681 | 9/1993 | Janis et al. ........................... | 395/685 |
| 5,291,601 | 3/1994 | Sands .................................... | 395/700 |
| 5,297,285 | 3/1994 | Abrahamsson et al. ............. | 395/685 |
| 5,339,430 | 8/1994 | Lundin et al. ....................... | 395/685 |
| 5,339,431 | 8/1994 | Rupp et al. .......................... | 395/710 |
| 5,375,241 | 12/1994 | Walsh ................................... | 395/700 |
| 5,408,665 | 4/1995 | Fitzgerald ............................ | 395/710 |
| 5,410,698 | 4/1995 | Danneels et al. .................... | 395/685 |
| 5,414,854 | 5/1995 | Heninger et al. .................... | 395/700 |
| 5,488,735 | 1/1996 | Anderson et al. ................... | 395/685 |
| 5,555,418 | 9/1996 | Nilsson et al. ...................... | 395/685 |
| 5,561,800 | 10/1996 | Sabetella ............................. | 395/685 |

*Primary Examiner*—Kevin A. Kriess
*Attorney, Agent, or Firm*—Debra K. Stephens

[57] ABSTRACT

The invention relates to a telecommunication device having software that is used for controlling function routines, which software includes several separately compilable program units. To reduce the time necessary for manufacturing the telecommunication device and the time necessary for implementing software changes, the program units each have a header which contains addresses (Ap1, Ap2, Ad) used for addressing procedures and/or data combined in the program units. Furthermore, a catalogue is provided which is available to all the loaded program units, which catalogue contains references for addressing the headers of the program units. Within the framework of the manufacture of the telecommunication device, the predefined program units need not be linked when the software of the telecommunication device is implemented.

4 Claims, 4 Drawing Sheets

SOFTWARE CONFIGURATION IN A TELECOMMUNICATION DEVICE

BACKGROUND OF THE INVENTION

1. Field of the Invention

The invention relates to a telecommunication device having software that is used for controlling function routines, which software is comprised of several separately compilable program units.

2. Background of the Related Art

Digital telecommunication devices, more specifically digital service switching points are often software-controlled, which software may comprise a considerable volume of, for example, several megabytes. Such software is comprised of several program units which are individually compiled and linked. For different applications of such telecommunication devices, different software configurations are used which have different sub-sets from the number of available program units. Different software configurations can thus be established with little programming expenditure. The available program units are stored in a library of the software development system used. They have a high degree of reuse.

During the manufacture of the telecommunication device, necessary program units are selected from the library. After being linked by a linker, the software is copied to a non-volatile storage medium of the telecommunication device, for example, to floppy disks or to a magnetic disk memory. Compiling and linking takes up a considerable amount of time for software that comprises numerous program units. For example, the compilation and linkage of the program units requires several hours' processing time. Furthermore, when program units are exchanged, for example, to be repaired, or when new program units are added, the implementation of the changed software in the telecommunication device requires long process times.

SUMMARY OF THE INVENTION

It is an object of the invention to improve the telecommunication device as defined in the opening paragraph in such a way that the time necessary for manufacturing the telecommunication device and the time necessary for implementing software changes is shortened.

This object is achieved in that the program units each have a header which contains addresses used for addressing procedures and/or data combined in the program units and in that a catalogue is available to all the loaded program units, which catalogue contains references for addressing the headers of the program units.

With software structured in this manner it is sufficient, within the framework of the manufacture of the telecommunication device, to copy the necessary compiled, individually linked program units direct from the library of the software development system to the provided non-volatile storage medium of the telecommunication device and to update the catalogue. A preceding time-intensive compilation and linkage of the cooperating program units is not necessary, because the program units are available in compiled form in the library and the coherence between the program units is established by the catalogue together with the headers of the program units. In the program units, one or several procedures which are linked in the individual program units, and/or data are combined.

Jump addresses combined to a jump table may also be regarded as data. For example, a procedure of a first program unit is called by a procedure of a second program unit in that, via a reference in the catalogue that catalogues the program units, first the position of the header of the first program unit together with the procedure to be called is determined in the working memory. The calling procedure or the associated second program unit respectively, knows at which position in the header of the first program unit the address for addressing the procedure to be called is stored, so that the procedure to be called can be addressed via this address. A further advantage is the easy exchangeability of program units without additional compiling and linking procedures. Faulty procedures or procedures to be supplemented or data of a program unit may be corrected or supplemented, while the program unit can, as a result of its changed version, be exchanged without the need for recompiling and re-linking the implemented program units. The cost of time for corrections of the software is reduced considerably. The invention can especially be implemented in service switching points, but also, for example, in transmission devices.

In an embodiment of the invention there is provided that the headers of said program units each have a first section whose structure is fixed a priori for the software.

The structure of the first section of the header of one of said program units is fixed by convention already before the oldest software program units are developed which are, more specifically, program units of the operating system. Especially program units of the operating system, which are the first software program units to be established, are thus in a position, via the entry addresses of each first section of a program unit header, to utilize also program units that had not yet been defined at all except for the first section of their respective program unit header when the program units of the operating system were generated.

In a further embodiment of the invention, the headers of said program units each have a respective second section whose structure is specific of the associated program unit.

Each second section of the program units contains entry addresses which can be used only by program units developed concurrently or later, because the structure of the second section is not fixed a priori as is the respective first section of a program unit header. The structure of the second section will not be established until the associated program unit is developed. The procedures or data that can be called via the second section may thus be more application-dependent than the procedures and data assigned to the first section of the respective header. The software can thus be adapted to the respective specific application of the telecommunication device. The application-dependent execution of the software is then determined especially by the younger program units by which the different software configurations are distinguished.

The invention is furthermore embodied in that the header of a program unit contains addresses for addressing a jump table which is used for addressing procedures of this program unit.

This embodiment is utilized when a number of procedures to be called which is variable depending on the software configuration is to be addressable via a single entry address in the header of the program unit. In this manner the number of procedures to be called can be changed without the need for changing the header of the respective program unit. This is especially advantageous for calling operating system procedures, because they are not changed along when the software is changed.

BRIEF DESCRIPTION OF THE DRAWINGS

These and other aspects of the invention will be apparent from and elucidated with reference to the embodiments described hereinafter.

In the drawings.

DESCRIPTION OF THE PREFERRED EMBODIMENTS

Figure 1:
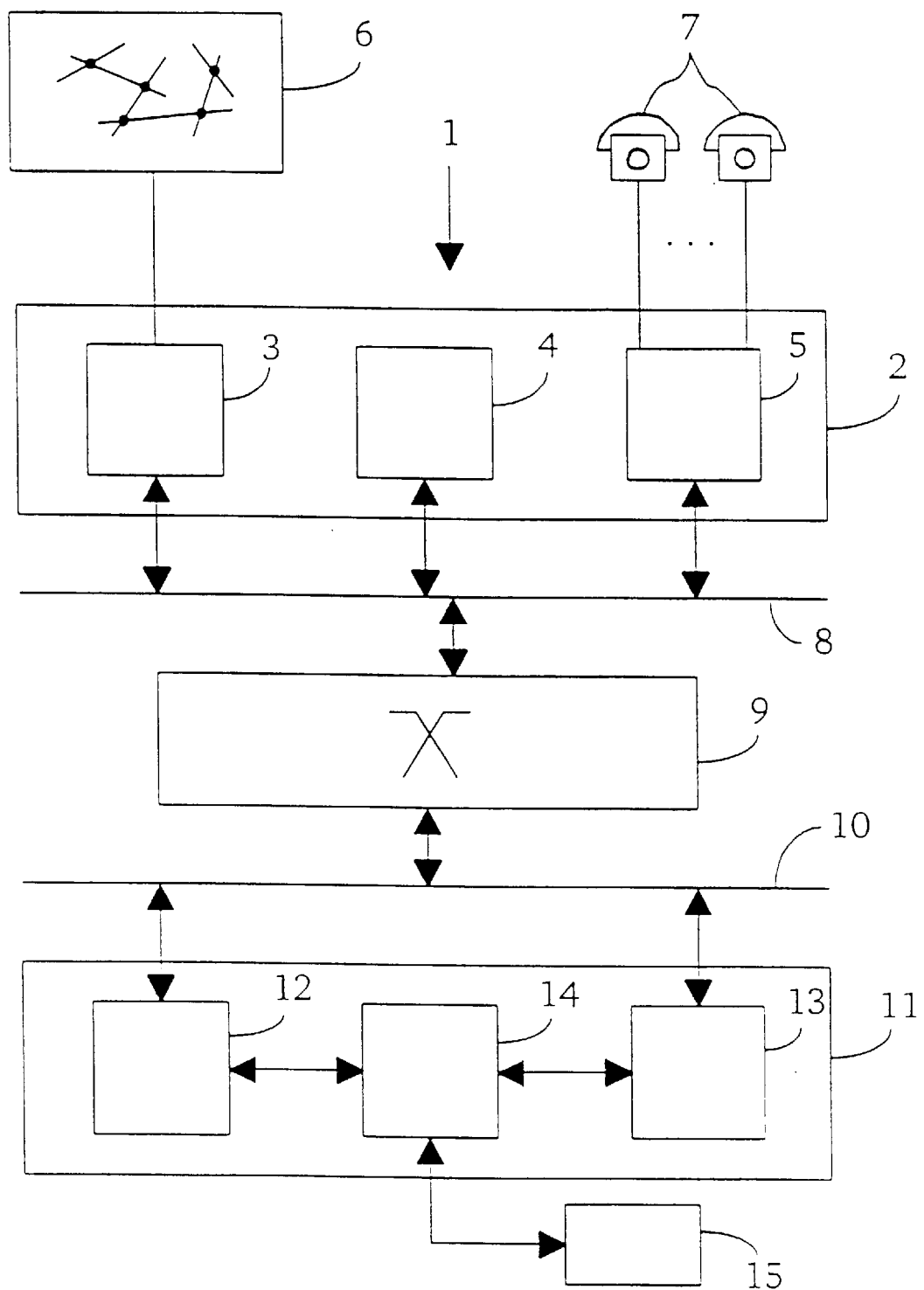
FIG. 1 shows a block circuit diagram of a service switching point.

The service switching point 1 represented in FIG. 1 comprises a peripheral modular unit 2 which includes a function block 3 which has one or more network interfaces, a service function block 4 and a function block 5 which has at least one subscriber interface. Function block 3 couples the service switching point 1 to a communication network 6, the coupling being realized especially via one of the service switching points integrated in the communication network 6, which switching points are designated as nodes in FIG. 1. The service function block 4 generates, for example, speech announcements or signal tones, or is used for providing specific services, such as, for example, the support of calls for setting up conference circuits. The function block 5 couples subscriber units 7, for example, telephones or facsimile devices, via their own interfaces integrated in the function block 5, to the service switching point 1. The function blocks 3, 4 and 5 of the peripheral modular unit 2 are coupled to a switching network 9 by a bus 8. This switching network 9 in its turn communicates with a central control unit 11 by a bus 10. The control unit 11 has two microprocessor units 12 and 13 operating independently, so that if either microprocessor unit has a failure, the other microprocessor unit takes over the control of the service switching point 1 on its own. The communication of the central control unit 11 with the peripheral modular unit 2 is performed over the switching network 9. The microprocessor units 12 and 13 comprise microprocessors and working memories (volatile memory, RAM). Also memory units which are not shown and contain a non-volatile memory (EPROM, floppy disks, magnetic disk memory) are provided. Furthermore, a function block 14 is represented as a constituent part of the central control unit 11, which function block comprises interfaces to units combined in a function block 15, which units can influence the service switching point 1 from the exterior via keypads and picture screens for the purpose of maintenance and repair.

Figure 2:
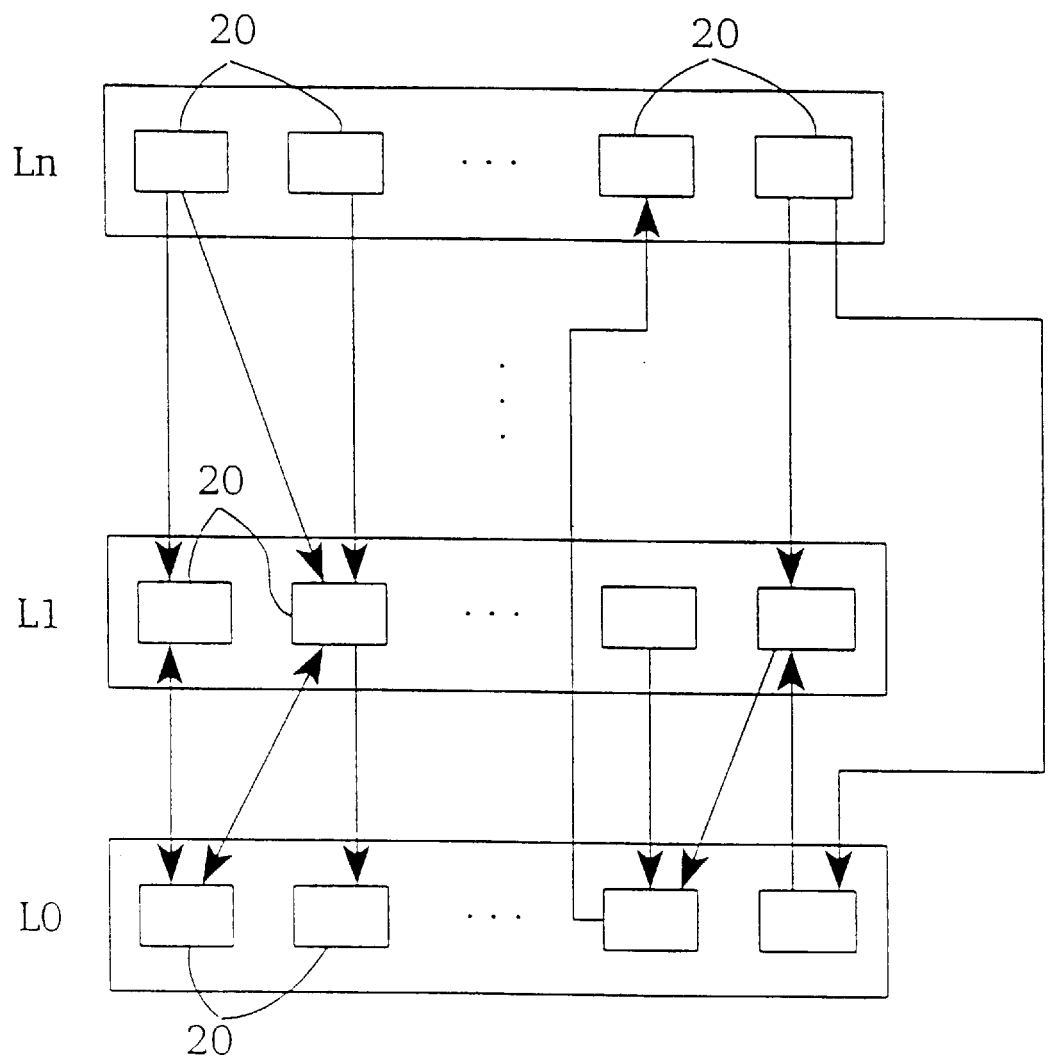
FIG. 2 shows a block circuit diagram of software for the service switching point.

FIG. 2 represents the structure of software that determines the control sequences in the microprocessor units 12 and 13 and thus functional flow of the service switching point 1. The software comprises program units 20 which combine at least one procedure and/or at least one data block. The software is hierarchically layered L0, L1, . . . , Ln which layers combine each a plurality of program units 20. The lower the layer is positioned in this diagram, the more abstract, more application-independent and older are the program units 20 included in this layer. For example, in the bottom layer L0 there are, in essence, program units 20 which are used for performing operating system functions and are thus the same for all the software configurations. These program units are defined and established first when the software is developed. The program units 20 positioned in the upper layer Ln, in essence, determine the specific embodiment of the surface switching point 1 or of the software configuration used and are thus exchanged or omitted depending on the application. The program units 20 can be separately compiled and linked. They can be taken in a compiled and linked form from a library which contains all the available developed program units 20 depending on the application and they can be integrated with the software of the service switching point 1. Arrows between the program units 20 indicate possible calling facilities of the program units 20 as an example. As a rule, a program unit 20 is called by another program unit 20 which is assigned to a higher-level layer. But especially the program units 20 of the bottom layer L0 also call other program units 20 from higher-level layers. This case is explained in more detail in FIG. 4.

The cooperation of the program units 20 of the service switching point 1 will be explained with reference to FIG. 3 with the aid of three program units 20a, 20b and 20c, whose reference numerals contain the letters a, b and c in addition to the number 20 for better discernability. Each program unit includes, as does program unit 20c, a header 21 which consists of a first section 22 and a second section 23. The associated program unit headers of program units 20a, and 20b are not represented. The first section 22 comprises areas 24, 25 and 26. In the area 24 are stored data for error repair or also administrative data. The area 25 contains addresses for addressing data or data fields, the area 26 contains addresses for addressing procedures, respectively. The area 27, just like area 26, also contains addresses for addressing procedures.

The first section 22 of the header 21 is fixed by convention and thus a priori, and is thus independent of the program unit version to be implemented. Changes in new versions of the program unit 20c do not have any effect on the structure of the first section 22. The structure of the first section 22 of an arbitrary program unit is thus already fixed even for still undeveloped program units. The second section 23 of the header 21 is specific of the program unit 20c. If the program unit 20c is changed, the second section 23 can be changed. For example, respective entry addresses can be appended to the section 23 for additional procedures of the program unit 20c. Entry addresses of the second section 23 of the program unit 20c can only be called by program units that, in accordance with FIG. 2, lie on the same or on a higher level and were thus developed simultaneously or later. All the program units 20, thus also the program units 20a and 20b, have a header structured in accordance with this diagram.

The program unit 20a, which is on a higher software level than the program unit 20c, contains a procedure 28 in the present illustrative embodiment. During the program run of the procedure 28, this procedure calls a procedure 29 of the program unit 20c in that first a memory cell $A_1$ of the area 27 of the header 21 is addressed. This address $A_1$ contains the initial address $A_{p1}$ of the procedure 29, so that the procedure 29 can be called indirectly via the header 21 of procedure 28.

The program unit 20b contains a procedure 30 which calls a procedure 31 contained in the program unit 20c during the run of procedure 30 and furthermore reads data from a data field 32 of the program unit 20c. The program unit 20b belongs to the operating system of the service switching point 1 and is thus on the bottom layer L0 of the software of the service switching point 1. This program unit 20b addresses procedures and data of the program unit 20c via the areas 25 and 26 of the header 21. In this case, to call the procedure 31, the procedure 30 first addresses a memory cell of the area 26 by the address $A_k$ in which cell again the initial address $A_{p2}$ of the procedure 31 is stored via which the procedure 31 can then be called. Furthermore, the procedure 30 of the program unit 20b addresses a memory cell in the area 25 of the header 21 of the program unit 20c, which cell is assigned to an address $A_j$ and accommodates the initial address $A_d$ of the data field 32, which initial address is to be applied when the data field 32 is read out. The structure of the areas 25 and 26 is determined by convention. An adaptation of the areas 25 and 26, for example, in the case of changes of software versions, is not provided. These areas 25 and 26 thus render fixedly defined entry addresses available.

Furthermore, a catalogue 33 is provided which is used for cataloguing all the program units 20 (thus also the program unit 20c) integrated with the software of the service switching point 1. The catalogue 33 accommodates references to all the program units 20 at respective program unit numbers. When the service switching point 1 is rendered operative, the catalogue 33 together with the necessary program units 20, is loaded from the non-volatile memory to the working memory of the service switching point 1. The references (for example, address data) assist in defining the position/initial address of the header 21 of the program unit 20c in the working memory of the service switching point 1. The program unit 20a with its procedure 28 and the program unit 20b with its procedure 30 both access the catalogue 33 when they wish to utilize procedures or data from the program unit 20c. For access to the procedures 29 and 31 and the data field 32 the relative positions of the entry addresses $A_i$ and $A_j$ and $A_k$ respectively, in the header 21 of the program unit 20c need only be accessible to the calling procedures 28 and 30 of the compiled program units 20a and 20b as described above. These relative positions are found especially in the procedures 28 and 30 themselves, but they can also be stored at different positions in the program units 20a and 20b. The position of the catalogue 33 in the working memory of the service switching point 1 is determined by convention and thus fixed, so that the catalogue can be found and addressed respectively, and is thus available to procedures of each program unit 20 (in this case procedures 28 and 30).

Since program units belonging to the operating system of the service switching point 1, such as the program unit 20b, need no longer be changed and recompiled when changes of the software configuration are made, and also when changes of the program unit 20c are made, it must be possible to call/read the procedures and data fields of the program unit 20c from the program unit 20b, the areas 25 and 26 which contain the memory cells having the addresses $A_j$ and $A_k$, have a fixed relative position in the address area of the header 21. Also the data for eliminating program errors, which data are stored in the first section 22 of area 24, must have a fixed relative position in the header 21, because the elimination of program errors is also effected by program units 20 which are to be assigned to the operating system.

With software of this structure it is no longer necessary to link the program units 20 required for a specific software configuration prior to their being used in the service switching point 1, because the cooperation of the program units 20 is made possible via the catalogue 33 and the individual headers of the program units 20. It is not necessary either to compile them, because the program units are available in a library in a compiled form. Since extensive software is necessary in service switching points, and the compilation and linking of the associated program units 20 may take several hours, it is possible with the aid of the invention to shorten the manufacture time of the service switching point 1. Predefined program units which are separately compiled and linked can thus be copied from a library to transportable data carriers (for example, floppy disks) and copied from the transportable data carriers to the non-volatile memory (for example, magnetic disk memory) of the service switching point 1. The individual program units 20 are then stored each in a file. The specific structure according to the invention of the software of the service switching point is unimportant for the copying to the transportable data carriers and the copying to the non-volatile memory of the service switching point.

The structure according to the invention of the program units will only be used when the program units are loaded into the working memory of the service switching point 1. First the headers of the program units 20 are evaluated by the loader. This comprises determining the length of the program unit, so that the respective memory location can be requested if there is an unassigned-memory management (not shown) of control unit 11, determining the program unit number for the catalogue 33 and determining information about the data areas in the program units, for example, the respective data class and data length which are evaluated by a Memory Management Unit MMU (not shown) of control unit 11 for controlling access authorizations. Depending on the results of the evaluation of the program unit headers, the program units are loaded into the working memory, the memory management unit (MMU) is set and the catalogue 33 is applied. Until this instant, the service switching point with its software is not yet ready to operate. To effect the operability, a so-termed recovery operation follows in which, for example, data are initialized and processes started. For this purpose, the loader calls specific procedures of the program units via the program unit headers. The processes may be considered specific forms of procedures within the program units.

If a program unit 20 of the software of the service switching point 1 is, for example, to be repaired or replaced by an improved version, this is simply possible with the service switching point 1 according to the invention by deleting the previous program unit and adding the new program unit without a renewed linkage being necessary. The program unit number and the associated reference in the catalogue 33 then remain the same. The transfer parameters of the respective program unit must not be changed and the order of the entry addresses in the header of the exchanged program unit must be retained. Apart from this, the new version of the program unit may certainly be larger or smaller than the old version of the program unit. For example, a new version of the program unit may also contain additional procedures. References to such additional procedures are appended to the header of the extended version of the program unit to the end of the second section of the header. In this manner there may be achieved with the supplemented procedures that other program units can be called for said new version of the program unit, which other program units have developed subsequent to the previous version of the program unit and were accordingly added to the software at a later stage. When the reference in the catalogue 33 is changed accordingly, a program unit may also be shifted in the working memory. Furthermore, when a suitable loader is used, it is also possible to exchange program units while the service switching point 1 is in operation.

When a program unit 20 is removed from the software of the service switching point 1, the respective entry in the catalogue 33 is deleted and thus also the reference to the respective header of this program unit 20. The memory utilized by this program unit 20 may now be released. The further program units 20 remain unchanged.

Figure 3:
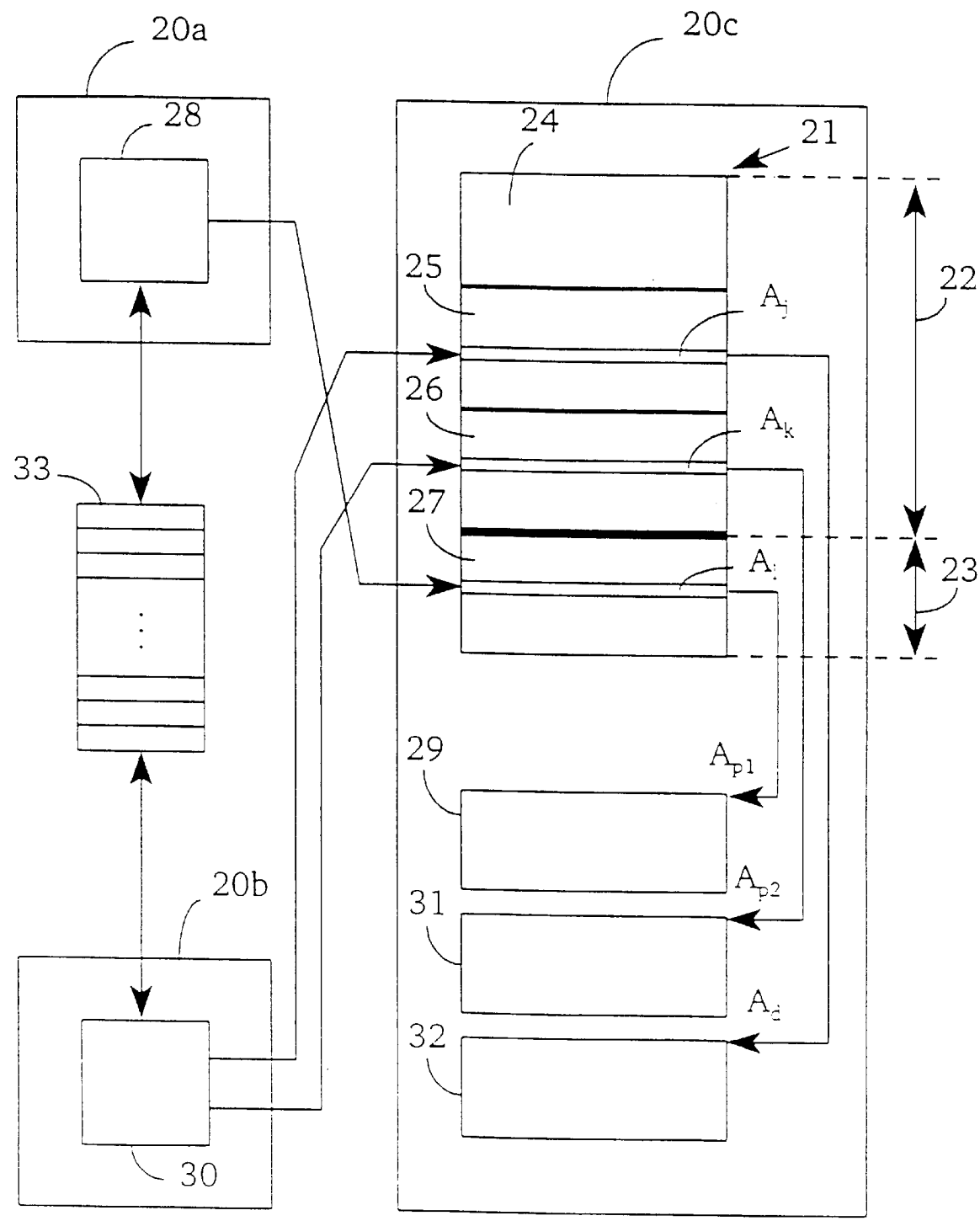
FIGS. 3 and 4 show block circuit diagrams of the cooperation of various program units.
Figure 4:
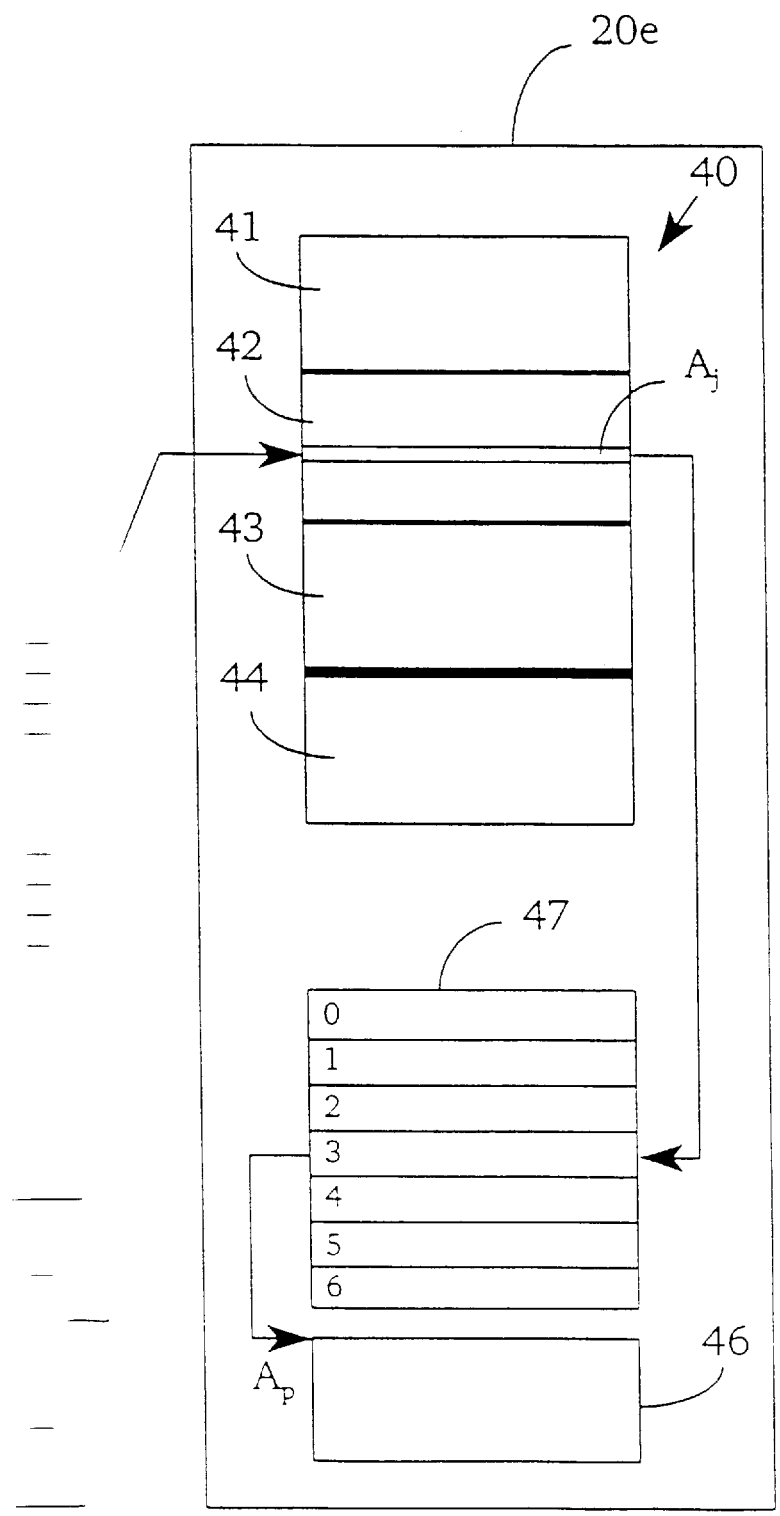

FIG. 4 shows a further possibility of a communication between program units 20 by two program units referenced 20d and 20e. The program unit 20e contains a header 40 which contains, as does the header 21 of program unit 20c of FIG. 3, a fixed section with three areas 41, 42 and 43, and a variable section with one area 44. The program unit 20d comprises a procedure 45. The program unit 20d is assigned to the operating system of the service switching point 1 and to the bottom layer L0 of the software of the service switching point 1. During its run, the procedure 45 calls a procedure 46 of the program unit 20e in that it first addresses a memory cell in the area 42 of the header 40 by the address $A_j$ addresses a specific entry of a jump table 47 of the program unit 20e via the reference or address respectively, stored in this memory cell, in which jump table the initial address $A_p$ of the procedure 46 to be called is stored. The entries of the jump table 47 are continuously numbered consecutively (in the present case from 0 to 6). During the communication between the calling procedure 45 and the program unit 20e, the procedure 45 transfers the relative position of the required entry in the jump table 47 together with further transfer parameters when procedure 45 calls. In the present case the entry is stored at number 3.

The program unit 20d determines the relative position of the program unit 20e in the working memory of the service switching point 1 again analogously to the description with respect to FIG. 3 via the catalogue 33 in which all available program units 20 (and thus also the program unit 20e) are catalogued.

The embodiment of the invented service switching point 1 according to FIG. 4 is obtained in that further procedures (not shown) can be addressed by the content of a single memory cell addressed here by $A_j$ in the area 42 of the header 40 and by transferring other relative positions in the table 47 in addition to procedure 46. Table 47 and the number of procedures which are addressed via this table may be extended at random, without the necessity of changing the program unit 20d and recompiling it for the described calling of procedure 46 by procedure 45, if only the relative position of the necessary table entry in the table 47 and the relative position of the procedure 46 in the program unit 20e are retained.

What is claimed:

1. Telecommunication device having software that is used for controlling function routines, which software is comprised of several separately compilable program units such that the program units each have a which contains addresses ($A_{p1}$, $A_{p2}$, $A_d$, $A_p$) used for addressing procedures and/or data combined in the program units and in that a catalogue is available to all the loaded program units, which catalogue contains references for addressing the headers of the program units.

2. Telecommunication device as claimed in claim 1, wherein the headers of said program units each have a first section (22) whose structure is fixed a priori for the software.

3. Telecommunication device as claimed in claim 1, wherein the headers of said program units each have a second section whose structure is specific of the associated program unit.

4. Telecommunication device as claimed in claims 1, wherein the header of a program unit contains addresses for addressing a jump table which is used for addressing procedures of this program unit.

* * * * *